United States Patent
Watanabe

(10) Patent No.: US 11,223,935 B2
(45) Date of Patent: Jan. 11, 2022

(54) ONBOARD COMMUNICATION DEVICE, COMMUNICATION METHOD AND COMMUNICATION PROGRAM

(71) Applicant: TOYOTA JIDOSHA KABUSHIKI KAISHA, Toyota (JP)

(72) Inventor: Isao Watanabe, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/141,366

(22) Filed: Jan. 5, 2021

(65) Prior Publication Data
US 2021/0243578 A1   Aug. 5, 2021

(30) Foreign Application Priority Data
Feb. 5, 2020   (JP) .............................. JP2020-018107

(51) Int. Cl.
*H04W 52/02* (2009.01)
*H04W 4/48* (2018.01)
*H04W 4/80* (2018.01)

(52) U.S. Cl.
CPC ............... *H04W 4/48* (2018.02); *H04W 4/80* (2018.02); *H04W 52/0216* (2013.01)

(58) Field of Classification Search
CPC .................................. H04W 4/48; H04W 4/80
See application file for complete search history.

(56) References Cited

U.S. PATENT DOCUMENTS

2019/0332371 A1*  10/2019   Kobayashi .............. H04W 4/40

FOREIGN PATENT DOCUMENTS

| JP | 2019-046092 | * | 3/2019 | .............. H04W 4/44 |
| JP | 2019-046092 | A | 3/2019 | |
| JP | 2019-175017 | A | 10/2019 | |

* cited by examiner

*Primary Examiner* — Tuan H Nguyen
(74) *Attorney, Agent, or Firm* — Oliff PLC

(57) ABSTRACT

An onboard communication device can execute communication with an exterior of a vehicle via a communication section. The onboard communication device includes: an acquiring section that acquires at least one of a speed of the vehicle or position information of the vehicle; a judging section that judges whether or not communication by the communication section is possible, based on an acquisition result of the acquiring section; and a control section that effects control such that, in a case in which it is judged that communication by the communication section is not possible, vehicle information is stored together with time information in a storage section, and, in a case in which it is judged that communication is possible, the communication section transmits, to an external device at the exterior of the vehicle, the vehicle information to which is appended the time information that is stored in the storage section.

9 Claims, 9 Drawing Sheets

FIG.8

| No. | TRANSMISSION DATA LIST | | |
|---|---|---|---|
| — | FINAL COMMUNICATION TIME | | |
| 1 | TIME DIFFERENCE | | |
| | 1 | AIR PRESSURE INFORMATION | ⎫ ENVIRONMENT |
| | 2 | ODOR INFORMATION | ⎭ INFORMATION |
| 2 | — (NO TIME) | | |
| | 1 | ODOR INFORMATION | |
| 3 | — (NO TIME) | | |
| | 1 | ODOR INFORMATION | ⎫ ENVIRONMENT INFORMATION |

TRANSMISSION DATA (rows 1, 2, 3)

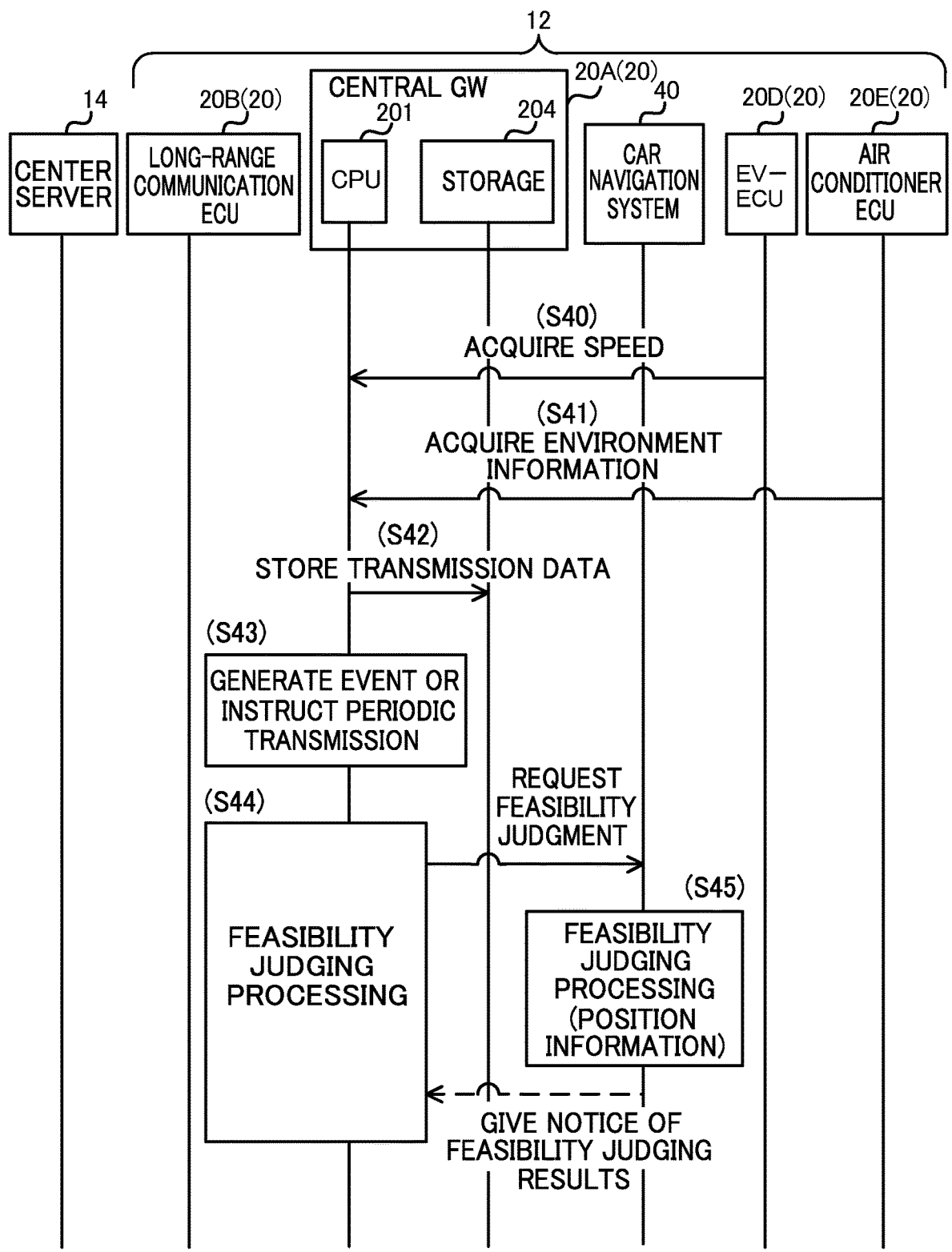

ONBOARD COMMUNICATION DEVICE, COMMUNICATION METHOD AND COMMUNICATION PROGRAM

CROSS-REFERENCE TO RELATED APPLICATION

This application is based on and claims priority under 35 USC 119 from Japanese Patent Application No. 2020-018107 filed on Feb. 5, 2020, the disclosure of which is incorporated by reference herein.

BACKGROUND

Technical Field

The present disclosure relates to an onboard communication device, a communication method and a communication program that transmit information from a vehicle to the exterior.

Related Art

Japanese Patent Application Laid-Open (JP-A) No. 2019-175017 discloses a communication device that applies LPWA (Low Power Wide Area) communication to the communications between a vehicle and a server at the exterior of the vehicle.

SUMMARY

On the other hand, there is the issue that, in communications that are in accordance with communication standards that enable low-power and long-range communication such as LPWA, the reliability of the communication while the vehicle is traveling or in cases in which there is blocking by an obstruction is poor.

An object of the present disclosure is to, in cases in which information of a vehicle is transmitted to the exterior by a communication standard that enables low-power and long-range communication, provide an onboard communication device, a communication method and a communication program that can suppress omissions in acquisition of information at the receiving side.

An onboard communication device of a first aspect of the present disclosure is an onboard communication device that carries out communication with an exterior of a vehicle via a communication section that is installed at the vehicle and is of a communication standard that enables communication that is lower power than mobile communication standards and is longer range than short-range wireless communication standards, the onboard communication device including: an acquiring section that acquires at least one of a speed of the vehicle or position information of the vehicle; a judging section that judges whether or not communication by the communication section is possible, based on an acquisition result of the acquiring section; and a control section that effects control such that, in a case in which it is judged that communication by the communication section is not possible, vehicle information is stored together with time information in a storage section, and, in a case in which it is judged that communication is possible, the communication section transmits, to an external device at the exterior of the vehicle, the vehicle information to which is appended the time information that is stored in the storage section.

At the onboard communication device of the first aspect, communication with the exterior of the vehicle is made possible via the communication section of a communication standard that enables communication that is lower power than mobile communication standards and is longer range than short-range wireless communication standards. Here, "mobile communication standards" include standards such as 3G, LTE, 4G, 5G and the like. "Short-range wireless communication standards" include standards such as Wi-Fi®, Bluetooth®, NFC (Near Field Communication) and the like. A standard such as Sigfox, LoRa®, Wi-Fi HaLow, Wi-SUN, RPMA, Flexnet, LTE-M, NB-IoT or the like, which are so-called LPWA, is included as the "communication standard" at the communication section. With LPWA, low-power and long-range communication is possible, but there is the issue that the reliability of communication while traveling or in a case of being blocked by an obstruction is poor.

Thus, at this onboard communication device, based on the acquisition result of the acquiring section, the judging section judges whether or not communication by the communication section is possible. In a case in which it is judged that communication is not possible, the control section stores vehicle information together with time information in a storage section. In a case in which, as a result of the judgment of the judging section, it is judged that communication is possible, the control section controls the communication section to transmit, to an external device, the vehicle information to which is appended the time information that is stored in the storage section. In accordance with this onboard communication device, in a case in which the vehicle is traveling at a speed at which there is a strong possibility that an external device cannot receive the vehicle information, the vehicle information is temporarily stored in the storage section, and the vehicle information is transmitted to the external device after the speed decreases. Further, in accordance with this onboard communication device, in a case in which the vehicle is traveling in a place in which there is a strong possibility that an external device cannot receive the vehicle information, the vehicle information is temporarily stored in the storage section, and the vehicle information is transmitted to the external device after the vehicle moves to a place where transmission is possible. Therefore, omissions in the acquisition of information at the external device are suppressed.

In an onboard communication device of a second aspect of the present disclosure, in the onboard communication device of the first aspect, the communication section carries out communication in one direction that is only transmission.

In accordance with the onboard communication device of the second aspect, even in a case in which communication results cannot be received from the external device, transmission to the external device is carried out based on the judgement by the judging section on the feasibility of communication. Therefore, omissions in the acquisition of information at the external device are suppressed.

In an onboard communication device of a third aspect of the present disclosure, in the onboard communication device of the first aspect or the second aspect, in a case in which the judging section judges that communication by the communication section is not possible, the control section stores a time period that has elapsed from a final communication time, in the storage section as the time information.

The onboard communication device of the third aspect has the feature that the time information that is stored in the storage section is the time period that has elapsed from the final communication time. In communication standards such as LPWA that enable communication that is lower power than mobile communication standards and longer range than short-range wireless communication standards, because the communication speed is slower than that of mobile communication standards, transmission takes time when there is a large amount of information to be transmitted. In this onboard communication device, by decreasing the amount of information relating to the time information, the transmission time when transmitting vehicle information, to which time information is appended, to an external device can be shortened.

In an onboard communication device of a fourth aspect of the present disclosure, in the onboard communication device of any one of the first aspect through the third aspect, communication with the exterior of the vehicle is possible via, in addition to the communication section, another communication section that is installed at the vehicle and is of another communication standard that is different than the communication standard, and the judging section judges whether communication by the another communication section is possible based on area information of the another communication standard or in a case in which a signal of the another communication standard is sensed, and, in a case in which the judging section judges that communication by the communication section is not possible and that communication by the another communication section is possible, the control section effects control such that the another communication section transmits, to the external device, the vehicle information to which is appended the time information that is stored in the storage section.

In the onboard communication device of the fourth aspect, communication with the exterior of the vehicle is possible via, in addition to the communication section, another communication section that is of another communication standard that is different than the communication standard. At this onboard communication device, in addition to judging whether or not communication by the communication section is possible, the judging section judges whether or not communication by the another communication section is possible. In a case in which the judging section judges whether or not communication by the another communication section is possible, the judgment is carried out based on the area information of the another communication standard, or the judgment is carried out when a signal of the another communication standard is sensed. Further, in a case in which communication by the communication section is judged to be not possible by the judging section, and communication by the another communication section is judged to be possible, the control section controls the another communication section to transmit, to the external device, the vehicle information to which is appended the time information that is stored in the storage section. In accordance with this onboard communication device, even if transmission by the communication section is not possible, transmission by the another communication section is possible, and therefore, delays in cases in which the external device acquires information can be reduced.

A communication method of a fifth aspect of the present disclosure is a communication method between a communication section, which is installed at a vehicle and is of a communication standard that enables communication that is lower power than mobile communication standards and is longer range than short-range wireless communication standards, and an external device at an exterior of the vehicle, the method including: an acquiring step of acquiring at least one of a speed of the vehicle or position information of the vehicle; a judging step of judging whether or not communication by the communication section is possible, based on an acquisition result of the acquiring step; and a control step of effecting control such that, in a case in which it is judged that communication by the communication section is not possible, vehicle information is stored together with time information in a storage section, and, in a case in which it is judged that communication is possible, the communication section transmits, to the external device, the vehicle information to which the time information is appended.

The communication method of the fifth aspect is applied to communication between a communication section, which is installed at a vehicle and which is of a communication standard that enables communication that is lower power than mobile communication standards and is longer range than short-range wireless communication standards, and an external device. "Mobile communication standards", "short-range wireless communication standards", and the "communication standard" of the communication section are as described above.

In accordance with this communication method, based on the acquisition result of the acquiring step, in the judging step, it is judged whether or not communication by the communication section is possible. In a case in which it is judged that communication is not possible, in the control step, the vehicle information is stored together with the time information in a storage section. Further, in a case in which, as a result of the judgment in the judging step, it is judged that communication is possible, in the control step, the communication section is controlled so as to transmit, to the external device, the vehicle information to which is appended the time information that is stored in the storage section. In accordance with this communication method, in a case in which the vehicle is traveling at a speed at which there is a strong possibility that an external device cannot receive the vehicle information, the vehicle information is temporarily stored in the storage section, and the vehicle information is transmitted to the external device after the speed decreases. Further, in accordance with this onboard communication method, in a case in which the vehicle is traveling in a place in which there is a strong possibility that an external device cannot receive the vehicle information, the vehicle information is temporarily stored in the storage section, and the vehicle information is transmitted to the external device after the vehicle moves to a place where transmission is possible. Therefore, omissions in the acquisition of information at the external device are suppressed.

A communication program of a sixth aspect of the present disclosure causes a computer to execute the respective steps of the communication method of the seventh aspect.

In accordance with the communication program of the sixth aspect, due a computer executing the respective steps of the communication method of the seventh aspect, omissions in the acquisition of information at the external device are suppressed.

In accordance with the present disclosure, in cases in which information of a vehicle is transmitted to the exterior by a communication standard that enables low-power and long-range communication, omissions in the acquisition of information at the receiving side can be suppressed.

BRIEF DESCRIPTION OF THE DRAWINGS

Exemplary embodiments of the present disclosure will be described in detail based on the following figures, wherein:

FIG. 8 is a drawing showing an example of the contents of a transmission data list in the first embodiment; and FIG. 9 is a sequence drawing showing the flow of processings until feasibility of communication is judged in a second embodiment.

DETAILED DESCRIPTION

First Embodiment

Figure 1:
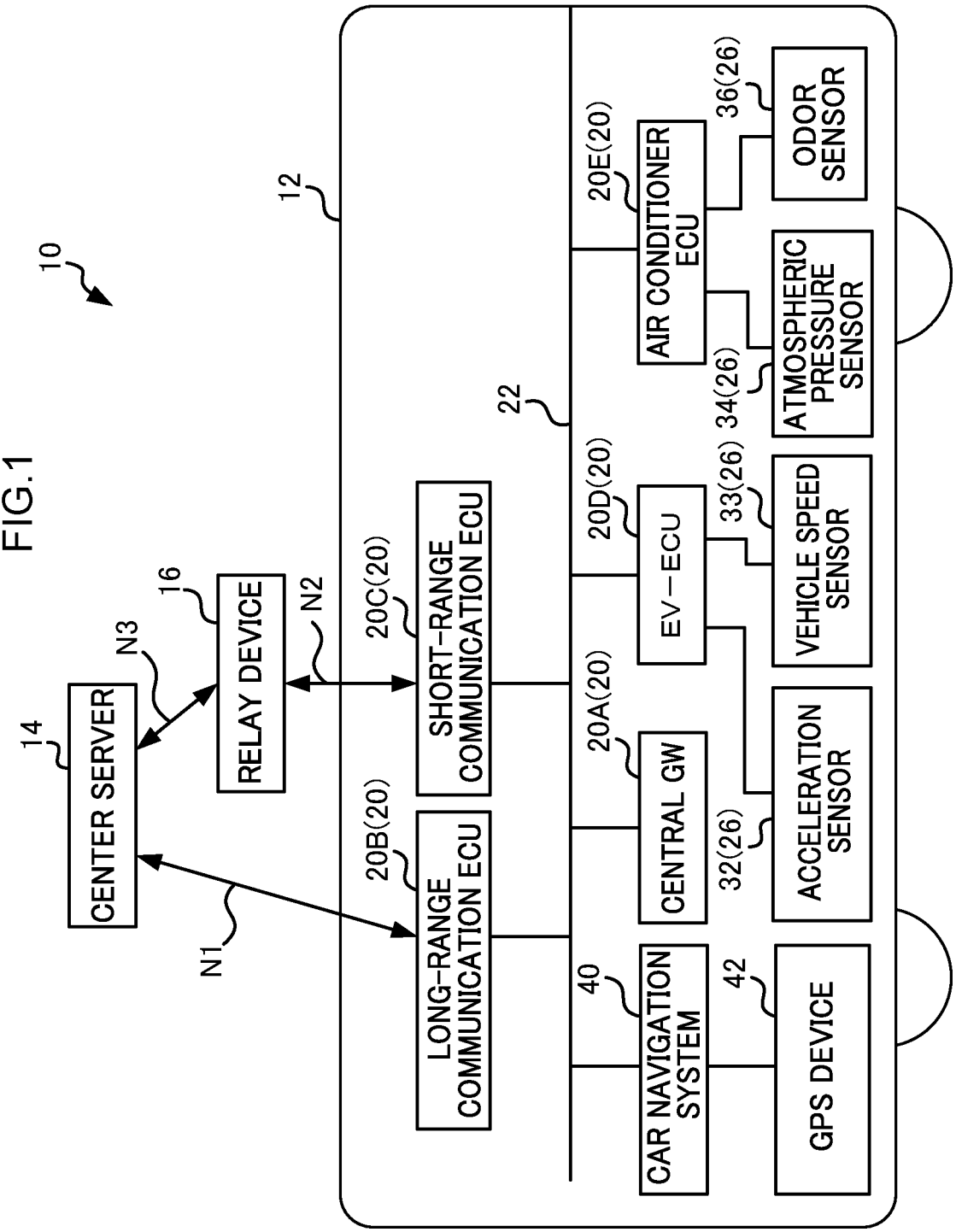
FIG. 1 is a drawing showing the schematic structure of a vehicle communication system relating to a first embodiment.

FIG. 1 is a block drawing showing the schematic structure of a vehicle communication system 10 relating to a first embodiment.

(Overview)

As shown in FIG. 1, the vehicle communication system 10 relating to the first embodiment is structured to include a vehicle 12, a center server 14, and a relay device 16. The center server 14 and the relay device 16 respectively are examples of the external device.

The vehicle 12 of the present embodiment is a compact EV mobility vehicle. In the present embodiment, the center server 14 that manages the vehicle 12 can periodically collect vehicle information relating to the vehicle 12, in order to grasp the situation of usage of and sense trouble with the vehicle 12.

The vehicle 12 is structured to include plural ECUs (Electrical Control Units) 20 and a car navigation system 40. The ECUs 20 are at least a central GW (Central Gateway) 20A, a long-range communication ECU 20B, a short-range communication ECU 20C, an EV-ECU 20D, and an air conditioner ECU 20E. The central GW 20A is an example of the onboard communication device. Further, the long-range communication ECU 20B is an example of the communication section, and the short-range communication ECU 20C is an example of the another communication section.

The respective ECUs 20 are connected via an external bus (communication bus) 22. Communication in accordance with CAN (Controller Area Network) protocol is carried out at the external bus 22. Note that the communication system of the external bus 22 is not limited to CAN, and CAN-FD (CAN With Flexible Data Rate), or Ethernet® or the like may be used.

The respective ECUs 20 are connected to auxiliary equipment 26 that are needed to control the vehicle 12 or that structure the vehicle 12. Note that the ECUs 20 to which the auxiliary equipment 26 are connected are not limited to the EV-ECU 20D and the air conditioner ECU 20E, and various types of ECUs such as a body ECU, a transmission ECU, a meter ECU, a multimedia ECU, a smart key ECU and the like exist.

The respective ECUs 20 are described in detail hereinafter. Note that the central GW 20A is described after that.

The long-range communication ECU 20B is a communication unit of a communication standard that enables communication that is lower power than mobile communication standards and is longer range than short-range wireless communication standards. Here, "mobile communication standards" include standards such as 3G, LTE, 4G, 5G and the like. "Short-range wireless communication standards" include standards such as Wi-Fi®, Bluetooth®, NFC (Near Field Communication) and the like.

At least a standard such as Sigfox, LoRa®, Wi-Fi HaLow, Wi-SUN, RPMA, Flexnet, LTE-M, NB-IoT or the like, which are so-called LPWA, is included as the "communication standard" at the long-range communication ECU 20B of the present embodiment. Generally, LPWA has a communication speed of around several kbps to several hundred kbps, and has a power saving performance that is such that it can operate from several years to several tens of years on a general battery, and has a wide range such that communication of from several km to several tens of km is possible. However, the types of LPWA are not limited to the aforementioned standards and the aforementioned examples, and there are cases in which ZigBee® and BLE (Bluetooth Low Energy) whose communication range is less than 1 km, or LTE Cat. 0 and LTE Cat. 1 whose communication speeds exceed 1 Mbps, are included.

The short-range communication ECU 20C is a communication unit of a short-range wireless communication standard. The Wi-Fi standard is used at the short-range communication ECU 20C of the present embodiment.

Here, the long-range communication ECU 20B is connected to the center server 14 by network N1. The network N1 of the present embodiment is a communication line relating to LPWA. Further, the short-range communication ECU 20C is connected to the relay device 16 by network N2. The network N2 of the present embodiment is a communication line of the Wi-Fi standard. Further, the center server 14 is connected to the relay device 16 by network N3. The network N3 is a communication network such as an internet line or the like.

The EV-ECU 20D is the ECU 20 that controls the motor and the like of the vehicle 12. An acceleration sensor 32 and a vehicle speed sensor 33 that serve as the auxiliary equipment 26 are connected to the EV-ECU 20D. Further, the EV-ECU 20D can compute the speed of the vehicle 12 on the basis of the acceleration sensed by the acceleration sensor 32 or the pulse of the vehicle speed sensor 33.

The air conditioner ECU 20E is the ECU 20 that controls the air conditioner of the vehicle 12. An atmospheric pressure sensor 34 and an odor sensor 36 that serve as the auxiliary equipment 26 are connected to the air conditioner ECU 20E. The air conditioner ECU 20E computes air pressure information on the basis of the atmospheric pressure sensor 34, and acquires odor information of the interior of the vehicle 12 on the basis of the odor sensor 36. In the present embodiment, the center server 14 is structured so as to collect air pressure information and odor information that are environment information from the vehicle 12. The environment information is an example of the vehicle information.

The car navigation system 40 is a device that displays the current position of the vehicle 12 on a monitor, and carries out route guidance through the monitor. A GPS (Global Positioning System) device 42, which is a GNSS (Global Navigation Satellite System) that can acquire position information of the vehicle 12, is connected to the car navigation system 40. Note that the car navigation system 40 may be connected via the multimedia ECU.

(Central GW)

Figure 2:
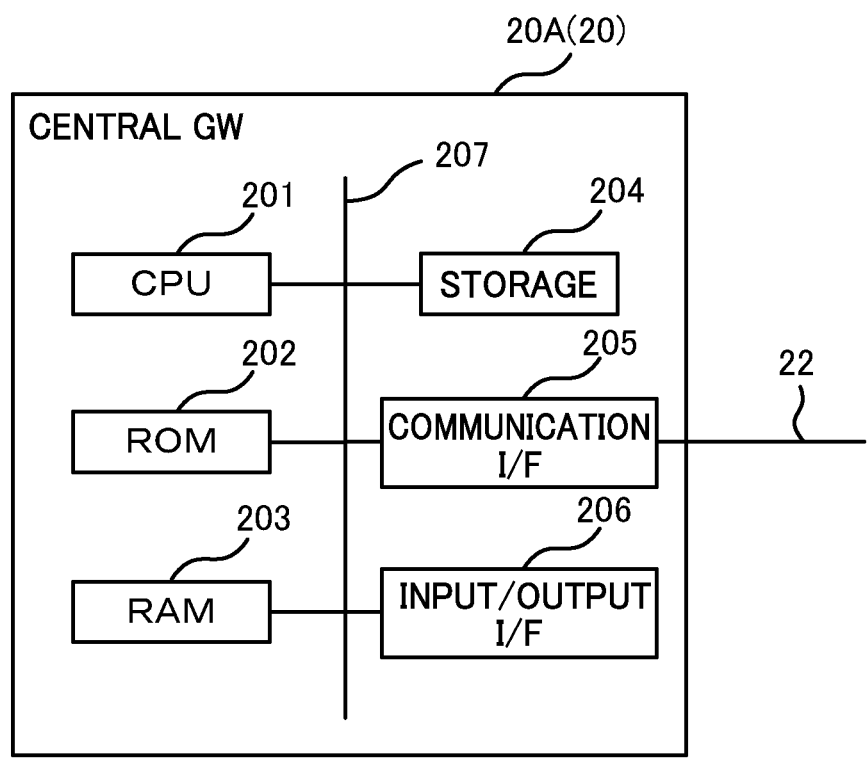
FIG. 2 is a block drawing showing hardware structures of a central GW of the first embodiment.

FIG. 2 is the basic structure of the central GW 20A. As shown in FIG. 2, the central GW 20A is structured to include a CPU (Central Processing Unit) 201, a ROM (Read Only Memory) 202, a RAM (Random Access Memory) 203, a storage 204, a communication I/F (Inter Face) 205, and an input/output I/F 206. The CPU 201, the ROM 202, the RAM 203, the storage 204, the communication I/F 205 and the input/output I/F 206 are connected so as to be able to communicate with one another via an internal bus 207.

The CPU 201 is a central computing processing unit, and executes various programs and controls the various sections. Namely, the CPU 201 reads-out a program from the ROM 202, and executes the program by using the RAM 203 as a workspace.

The ROM 202 stores various programs and various data. The RAM 203 temporarily stores programs and data as a workspace.

The storage 204 is structured by an HDD (Hard Disk Drive) or an SSD (Solid State Drive).

The communication I/F 205 is an interface for connection with the other ECUs 20. A communication standard in accordance with CAN protocol is used at this interface. The communication I/F 205 is connected to the external bus 22.

The input/output I/F 206 is an interface for communication with the auxiliary equipment 26 that are installed in the vehicle 12. Although no auxiliary equipment 26 are connected to the input/output I/F 206 shown in FIG. 2, the acceleration sensor 32, the vehicle speed sensor 33, the atmospheric pressure sensor 34, and the odor sensor 36 that are connected to the other ECUs 20 may be connected to the input/output I/F 206 of the central GW 20A.

Note that, depending on the ECU 20, the storage 204 and the input/output I/F 206 do not necessarily have to be provided. Further, the long-range communication ECU 20B and the short-range communication ECU 20C have dedicated chip sets of their respective communication standards, in addition to the CPU 201, the ROM 202, the RAM 203, and the communication I/F 205.

Figure 3:
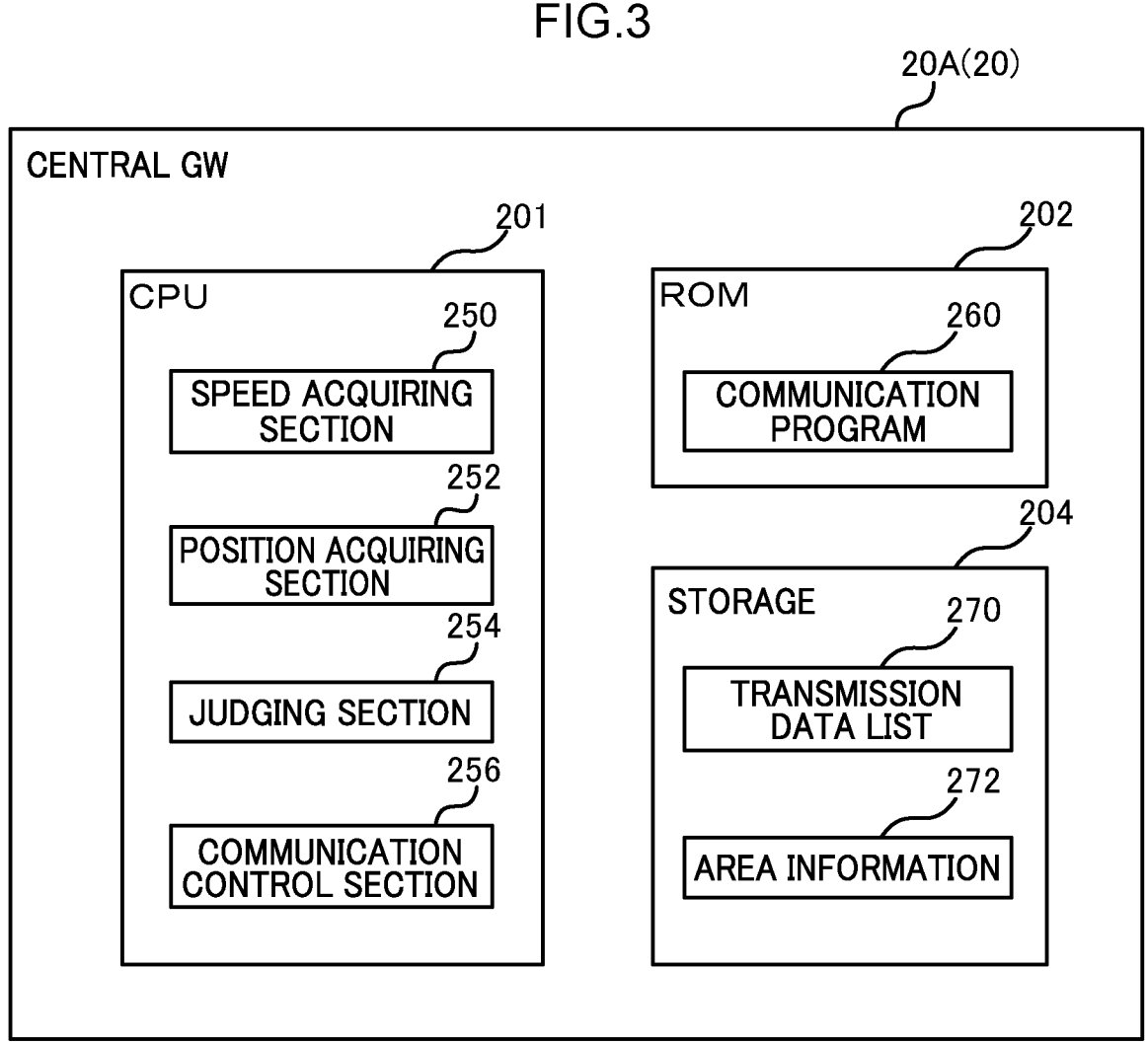
FIG. 3 is a block drawing showing functional structures of the central GW of the first embodiment.

FIG. 3 is a block drawing showing an example of the functional structures of the central GW 20A. As shown in FIG. 3, at the central GW 20A, the CPU 201 functions as a speed acquiring section 250, a position acquiring section 252, a judging section 254 and a communication control section 256. Further, at the central GW 20A, a communication program 260 is stored in the ROM 202, and a transmission data list 270 and area information 272 are stored in the storage 204. The speed acquiring section 250, the position acquiring section 252, the judging section 254 and the communication control section 256 are realized by the CPU 201 reading-out the communication program 260 that is stored in the ROM 202, and executing the communication program 260. The speed acquiring section 250 and the position acquiring section 252 corresponds to the acquiring section of the present disclosure.

The final communication time at which transmission to the center server 14 was carried out, and one or plural transmission data that are to be transmitted to the center server 14, are stored in the transmission data list 270. Further, the transmission data includes one or plural environment information, and a time difference, which is the time period that has elapsed from the final communication time of the times when an attempt was made to transmit that transmission data, is stored (see FIG. 8).

Map information relating to LPWA communication areas and Wi-Fi spots are stored in the area information 272.

The speed acquiring section 250 has the function of acquiring the speed of the vehicle 12. Concretely, the speed acquiring section 250 acquires speed information from the EV-ECU 20D.

The position acquiring section 252 has the function of acquiring position information of the vehicle 12. Concretely, the position acquiring section 252 acquires position information from the GPS device 42 via the car navigation system 40.

The judging section 254 has the function of judging whether or not communication is possible at each of the long-range communication ECU 20B and the short-range communication ECU 20C. The judging section 254 judges that communication by the long-range communication ECU 20B is possible in a case in which the speed of the vehicle 12 acquired at the speed acquiring section 250 is less than a communication possible speed that is set in advance. On the other hand, the judging section 254 judges that communication at the long-range communication ECU 20B is not possible in a case in which the speed of the vehicle 12 is greater than or equal to the communication possible speed that is set in advance. Here, the communication possible speed, which is the threshold value of the judgement that is based on speed, is set to a speed that is lower than a speed at which LPWA communication at the long-range communication ECU 20B actually becomes impossible.

Further, in a case in which the judging section 254 refers to the area information 272 that is stored in the storage 204, and the position, which relates to the position information acquired at the position acquiring section 252, is a communication area of LPWA, the judging section 254 judges that communication by the long-range communication ECU 20B is possible. On the other hand, in a case in which the judging section 254 refers to the area information 272, and the position, which relates to the position information acquired at the position acquiring section 252, is outside of an LPWA communication area, the judging section 254 judges that communication by the long-range communication ECU 20B is not possible.

Further, in a case in which the judging section 254 refers to the area information 272 stored in the storage 204, and the position, which relates to the position information acquired at the position acquiring section 252, is a Wi-Fi spot, the judging section 254 judges that communication by the short-range communication ECU 20C is possible. On the other hand, in a case in which the judging section 254 refers to the area information, and the position, which relates to the position information acquired at the position acquiring section 252, is outside of a Wi-Fi spot, the judging section 254 judges that communication by the short-range communication ECU 20C is not possible.

The communication control section 256 that serves as the control section has the functions of controlling the long-range communication ECU 20B or controlling the short-range communication ECU 20C, and transmitting transmission data that includes environment information to the center server 14. Further, the communication control section 256 has the function of storing environment information together with time information in the storage 204.

Concretely, in a case in which the judging section 254 judges that communication by the long-range communication ECU 20B and the short-range communication ECU 20C are impossible, the communication control section 256 stores environment information together with time information in the storage 204 as the transmission data. The time information that is stored in this case is the time difference that is the time period that has elapsed from the final communication time. Further, in a case in which the judging section 254 judges that communication by the long-range communication ECU 20B is possible, the communication control section 256 transmits the transmission data to the center server 14 via the long-range communication ECU 20B. Moreover, in a case in which the judging section 254 judges that communication by the long-range communication ECU 20B is not possible and that communication by the short-range communication ECU 20C is possible, the communication control section 256 transmits the transmission data to the relay device 16 via the short-range communication ECU 20C.

Here, in a case in which environment information that has not yet been transmitted is stored in the storage 204, the transmission data that is transmitted in the present embodiment is environment information to which time information is appended. In a case in which environment information that has not yet been transmitted is not stored in the storage 204, the transmission data that is transmitted in the present embodiment is the environment information only.

(Flow of Control)

Figure 4:
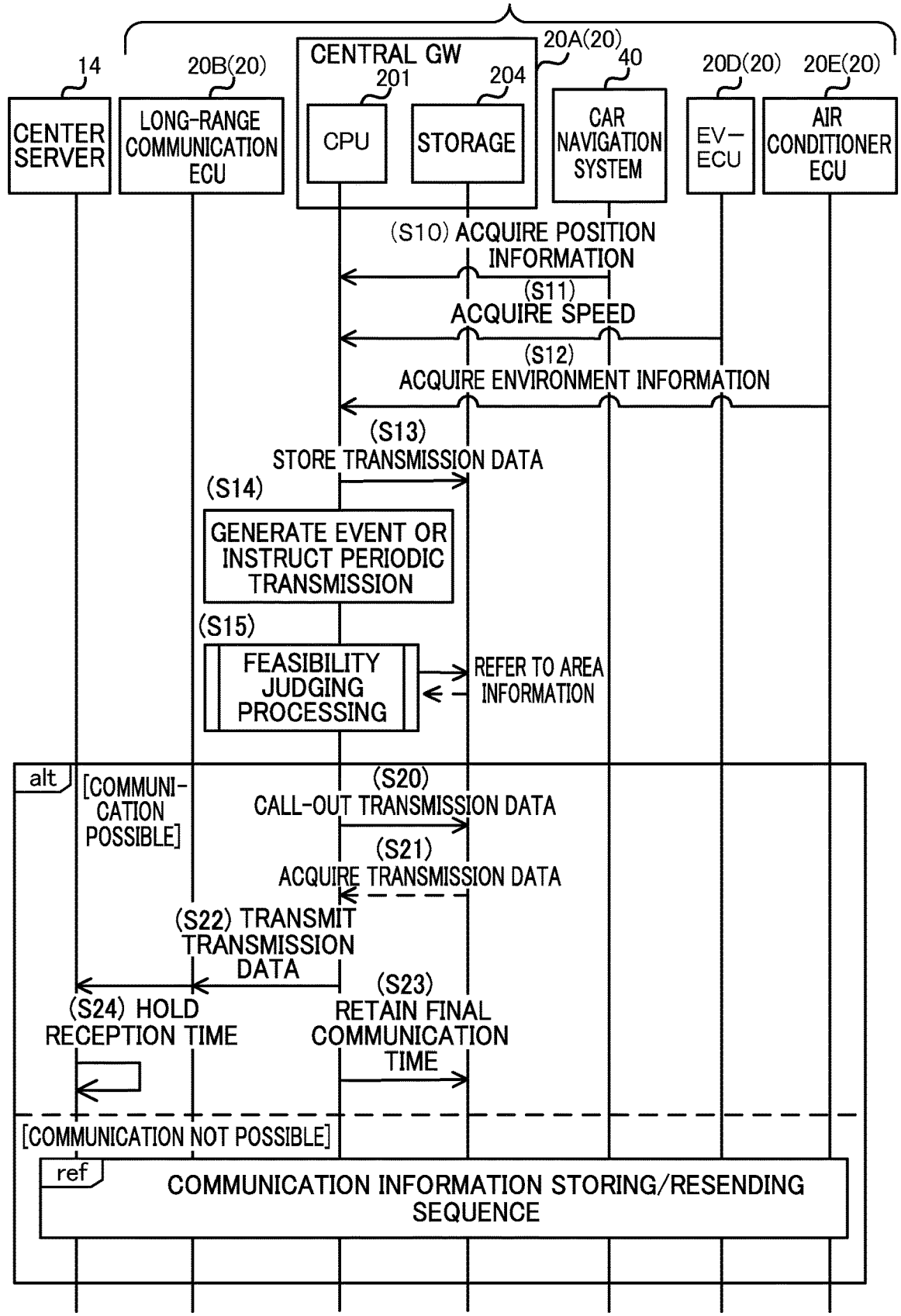
FIG. 4 is a sequence drawing that shows the flow of processings until transmission data is transmitted from a vehicle to a center server in the first embodiment.
Figure 5:
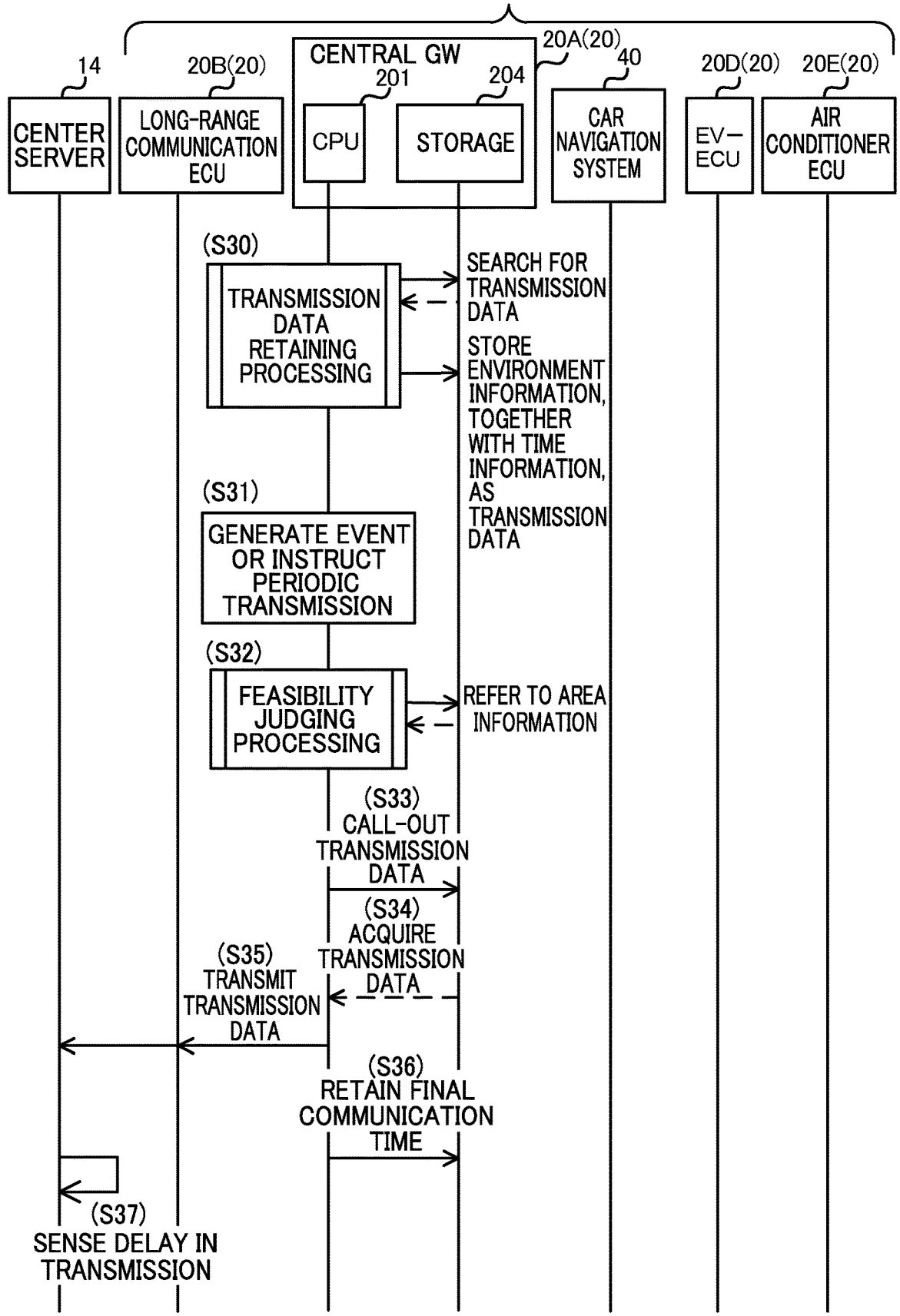
FIG. 5 is a sequence drawing showing the flow of processings of a communication information storing/resending sequence of the first embodiment.

Examples of the flow of processings until the transmission data is transmitted from the vehicle 12 to the center server 14 in the present embodiment are described by using the sequence drawings of FIG. 4 and FIG. 5.

In step S10 of FIG. 4, at the central GW 20A, the CPU 201 acquires position information from the car navigation system 40.

In step S11, at the central GW 20A, the CPU 201 acquires the speed of the vehicle 12 from the EV-ECU 20D.

In step S12, at the central GW 20A, the CPU 201 acquires environment information from the air conditioner ECU 20E. This environment information includes air pressure information relating to the air pressure, and odor information relating to odors at the interior of the vehicle 12.

In step S13, at the central GW 20A, the CPU 201 stores the acquired environment information in the storage 204 as transmission data.

Note that the processings of acquiring the respective information and storing the transmission data from step S10 through step S13 are executed at a predetermined period.

In step S14, at the central GW 20A, the CPU 201 generates an event or executes a periodic transmission instruction. Here, an event is trigger such as, for example, the time of starting-up or turning-off the vehicle 12, the time of parking the vehicle 12, the time when the vehicle occupant enters or exits the vehicle, or the like. Further, a periodic transmission instruction is an instruction to transmit that is generated each preset time, e.g., each one hour.

In step S15, at the central GW 20A, the CPU 201 executes feasibility judging processing while referring to the area information 272 that is stored in the storage 204. Details thereof are described later. Due to this feasibility judging processing, it is judged whether at least one of communication by the long-range communication ECU 20B and communication by the short-range communication ECU 20C is possible, or whether communication of the both is not possible. In a case in which the CPU 201 judges that communication is possible, the CPU 201 moves on to step S20. In a case in which the CPU 201 judges that communication is not possible, the CPU 201 moves on to step S30.

In a case in which the CPU 201 judges that communication is possible, in step S20, at the central GW 20A, the CPU 201 calls-out the transmission data that is stored in the storage 204.

In step S21, at the central GW 20A, the CPU 201 acquires the transmission data from the storage 204 that received the call.

In step S22, at the central GW 20A, the CPU 201 transmits transmission data to the center server 14 via the long-range communication ECU 20B. Note that, in a case in which the long-range communication ECU 20B is unable to communicate, and the short-range communication ECU 20C can communicate, the CPU 201 transmits the transmission data to the relay device 16 via the short-range communication ECU 20C.

Further, in step S23, at the central GW 20A, the CPU 201 stores the final communication time in the transmission data list 270 of the storage 204.

In step S24, at the center server 14, the reception time is held simultaneously with the reception of the transmission data. Namely, the time at which the transmission data is received is stored.

On the other hand, in step S15, in a case in which the CPU 201 judges that communication is not possible, thereafter, a communication information storing/resending sequence is executed at the respective devices.

The communication information storing/resending sequence is described next by using FIG. 5.

In step S30, at the central GW 20A, the CPU 201 executes transmission data retaining processing. Details thereof are described later. Due to this transmission data retaining processing, the environment information which was attempted to be transmitted is, together with the time information, stored as transmission data.

In step S31, at the central GW 20A, the CPU 201 generates an event or executes a periodic transmission instruction. Details of the processing are similar to above-described step S14.

In step S32, at the central GW 20A, the CPU 201 executes feasibility judging processing while referring to the area information 272 stored in the storage 204. Details thereof are described later. Due to the feasibility judging processing, it is judged whether at least one of communication by the long-range communication ECU 20B and communication by the short-range communication ECU 20C is possible, or whether communication by the both is not possible. FIG. 5 describes the flow in a case in which the CPU 201 judges that communication is possible. However, in a case in which the CPU 201 judges the communication is not possible, processing returns to step S30, and the environment information that is newly acquired at that point in time is stored as the transmission data. Namely, the transmission data list 270 is overwritten.

In a case in which the CPU 201 judges that communication is possible in step S32, the processings of step S33 and thereafter are executed. Note that the processings from step S33 through step S36 are similar to the processings from step S20 through step S23.

In step S37, the center server 14 senses a delay in communication. Concretely, the center server 14 senses a delay in communication in a case in which a time difference is included in the transmission data, when transmission data is received.

The flow of the feasibility judging processing in step S15 and step S32 is described next by using the flowchart of FIG. 6.

Figure 6:
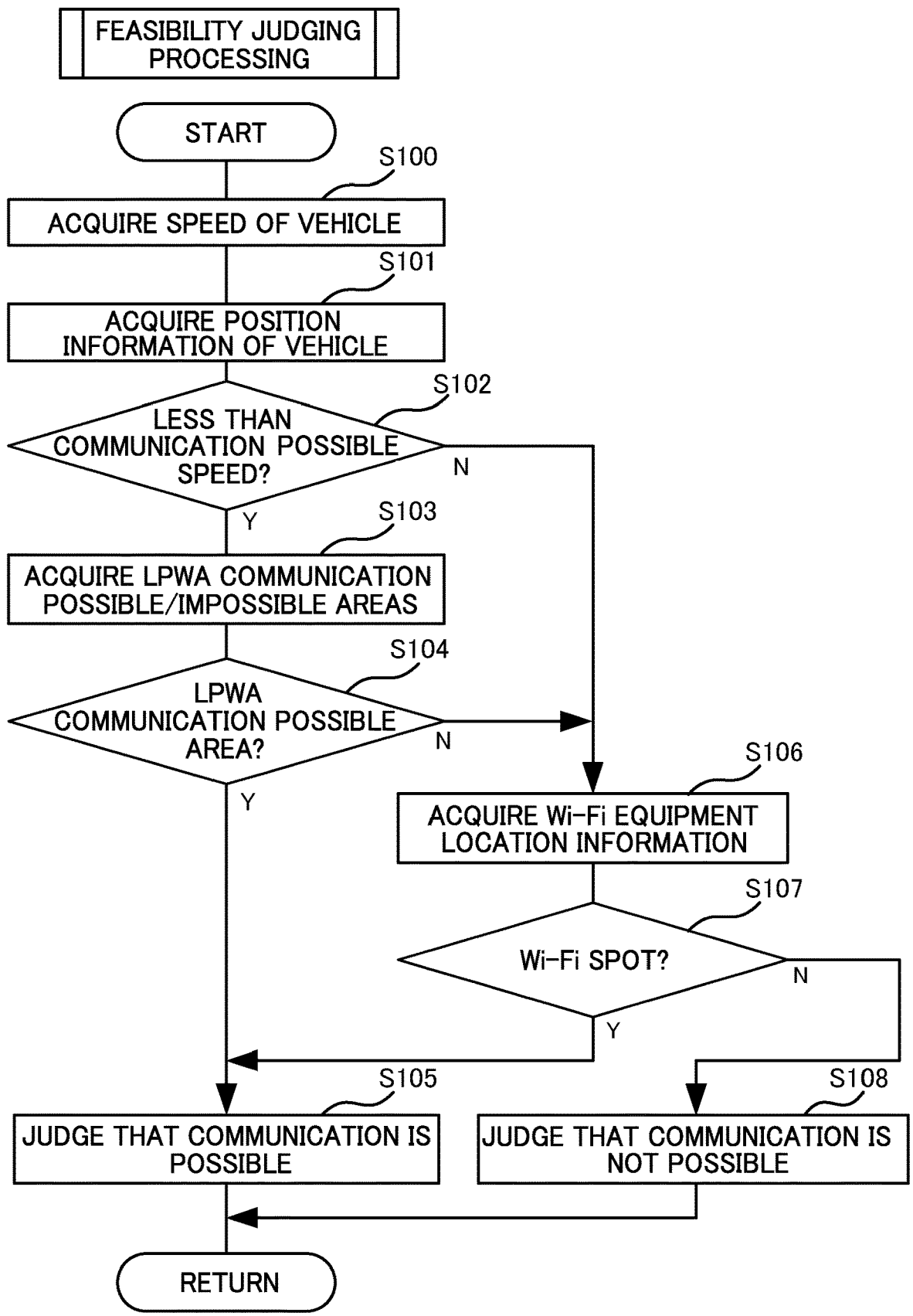
FIG. 6 is a flowchart showing the flow of feasibility judging processing that is executed at the central GW in the first embodiment.

In step S100 of FIG. 6, the CPU 201 acquires the speed of the vehicle 12.

In step S101, the CPU 201 acquires the position information of the vehicle 12.

In step S102, the CPU 201 carries out a judgment as to whether or not the acquired speed is less than the communication possible speed. In a case in which the CPU 201 judges that the acquired speed is less than the communication possible speed, the CPU 201 moves on to step S103. On the other hand, in a case in which the CPU 201 judges that the acquired speed is not less than the communication possible speed, i.e., is greater than or equal to the communication possible speed, the CPU 201 moves on to step S106.

In step S103, the CPU 201 acquires information of areas in which LPWA communication is possible/impossible. Concretely, the CPU 201 acquires map information of the area information 272 that is read-out from the storage 204.

In step S104, the CPU 201 carries out judgment as to whether or not the vehicle 12 in positioned in an area in which LPWA communication is possible. In a case in which the CPU 201 judges that the vehicle 12 is positioned in an area in which LPWA communication is possible, the CPU 201 moves on to step S105. On the other hand, in a case in which the CPU 201 judges that the vehicle 12 is positioned outside of an area in which LPWA communication is possible, the CPU 201 moves on to step S106.

In step S105, the CPU 201 judges that communication is possible, and then ends the feasibility judgement.

In step S106, the CPU 201 acquires location information of Wi-Fi equipment. Concretely, the CPU 201 acquires location information of Wi-Fi equipment from the Wi-Fi spots on the map of the area information 272 that was read-out from the storage 204.

In step S107, the CPU 201 carries out judgement as to whether or not the vehicle 12 is positioned in a Wi-Fi spot. In a case in which the CPU 201 judges that the vehicle 12 is positioned in a Wi-Fi spot, the CPU 201 moves on to step S105. On the other hand, in a case in which the CPU 201 judges that the vehicle 12 is not positioned in a Wi-Fi spot, the CPU 201 moves on to step S108.

In step S108, the CPU 201 judges that communication is not possible, and then ends the feasibility judgement.

Figure 7:
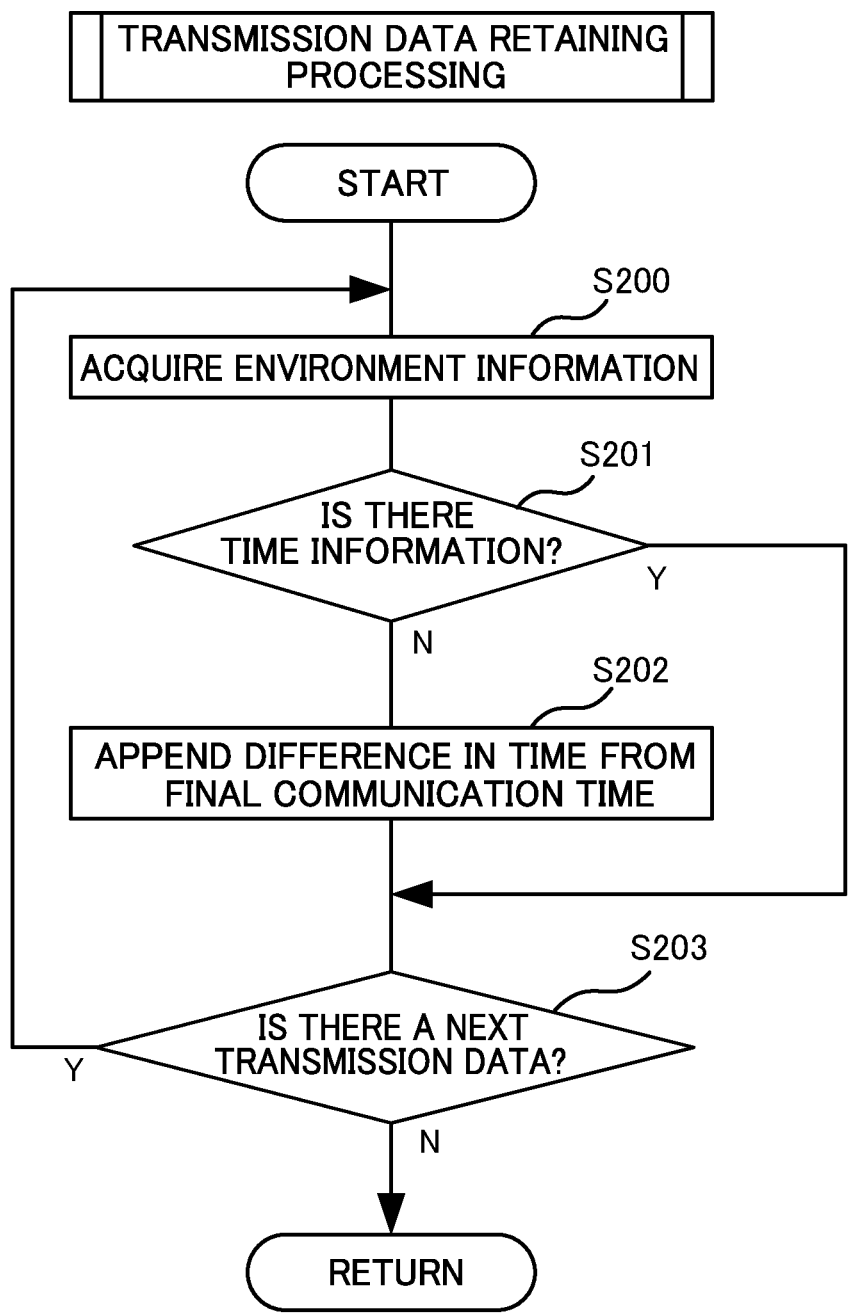
FIG. 7 is a flowchart showing the flow of transmission data retaining processing that is executed at the central GW in the first embodiment.

Next, the flow of the transmission data retaining processing of step S30 is described by using the flowchart of FIG. 7.

In step S200 of FIG. 7, the CPU 201 acquires the environment information that is to be transmitted to the center server 14. Concretely, while referring to the transmission data that is stored in the transmission data list 270 of the storage 204, the CPU 201 acquires the environment information that is included in the transmission data of a given time. This "time" is the time that an attempt was made to transmit the transmission data.

In step S201, the CPU 201 carries out judgment as to whether or not time information is appended to the acquired environment information. In a case in which the CPU 201 judges that time information is appended to the acquired environment information, the CPU 201 moves on to step S203. On the other hand, in a case in which the CPU 201 judges that time information is not appended to the acquired environment information, the CPU 201 moves on to step S202.

In step S202, the CPU 201 appends the time difference, which is between the final communication time stored in the transmission data list 270 and the time that transmission of the transmission data was attempted, to the transmission data to which a time is not appended. For example, as shown in FIG. 8, in a case in which a time is not appended to transmission data No. 2, the CPU 201 applies a time difference to that transmission data.

In step S203, the CPU 201 carries out judgement as to whether or not there is a next transmission data. In a case in which the CPU 201 judges that there is a next transmission data, the CPU 201 returns to step S200. On the other hand, in a case in which the CPU 201 judges that there is no next transmission data, the CPU 201 ends the transmission data retaining processing.

(Summary of First Embodiment)

In the present embodiment, the object is for the center server 14 to periodically collect environment information in order to grasp the situation of usage of the compact EV mobility vehicle 12, and in particular, the air environment within the cabin of the vehicle 12. In a case in which communication is carried out in accordance with mobile communication standards such as LTE or the like, there is quick deliverability of information, but a communication cost is incurred. Further, at all mobility services, if communication in accordance with a mobile communication standard is employed, there is the concern of a strain on the resources for the high-speed communication that is needed for remote driving or automatic driving or the like.

On the other hand, in a case in which communication is carried out in accordance with a short-range wireless communication standard such as Wi-Fi or the like, the cost of installing communicators is incurred because the communication range is short. This holds true also in cases of employing communication in accordance with DSRC (Dedicated Short Range Communications) that is used in Intelligent Transportation Systems (ITS). Because the installation costs of DSRC are expensive, there are few cases in which communicators are installed in the suburbs, and DSRC is not suitable for mobility services in the suburbs. Further, with DSRC, there is the need to develop ECUs that are suited to wireless specifications of respective countries, which runs counter to business models that aim to provide mobility services inexpensively.

On the basis of the above, at the central GW 20A that is the onboard communication device, communication of the vehicle 12 with the exterior is made possible by the long-range communication ECU 20B that is LPWA and that enables communication that is lower power than mobile communication standards and longer range than short-range wireless communication standards. Low-power and long-range communication is possible by LPWA, but there is the issue that the reliability of the communication while the vehicle is traveling or in cases in which there is blocking by an obstruction is poor.

Thus, the central GW 20A of the present embodiment is structured so as to, on the basis of the speed of the vehicle 12 and the position information of the vehicle 12, judge whether or not communication by the long-range communication ECU 20B is possible. Then, at the central GW 20A, in a case in which the CPU 201 judges that communication is not possible, the CPU 201 stores the environment information together with time information in the storage 204 as transmission data. Further, in a case in which the CPU 201 judges that communication is possible, the CPU 201 controls the long-range communication ECU 20B to transmit the transmission data that is stored in the storage 204 to the center server 14.

In accordance with the present embediment, in a case in which the vehicle 12 is traveling at a speed at which there is a strong possibility that the center server 14 will not be able to receive the transmission data, or in a case in which the vehicle 12 is traveling in a place in which there is a strong possibility that the center server 14 will not be able to receive the transmission data, the transmission data is temporarily stored in the storage 204. Then, the transmission data is transmitted to the center server 14 after the speed of the vehicle 12 decreases, or after the vehicle 12 moves to a place where transmission is possible. Due thereto, in accordance with the present embodiment, omissions in the acquisition of information at the center server 14 are suppressed.

In particular, in a case in which the communication by LPWA is in one direction that is transmission only, results of communication cannot be given from the center server 14. Therefore, in accordance with the central GW 20A of the present embodiment, even in a case in which communication results cannot be received from the center server 14, because transmission to the center server 14 is carried out on the basis of the judgment on the feasibility of communication at the central GW 20A, omissions in the acquisition of information at the center server 14 are suppressed.

Further, in the present embodiment, communication with the exterior of the vehicle is possible by the Wi-Fi short-range communication ECU 20C, in addition to the LPWA long-range communication ECU 20B. Therefore, at the central GW 20A, a judgment as to whether or not communication by the short-range communication ECU 20C is possible is executed, in addition to the judgment as to whether or not communication by the long-range communication ECU 20B is possible. Accordingly, in accordance with the present embodiment, even in a case in which communication by the long-range communication ECU 20B is not possible, communication by the short-range communication ECU 20C is possible, and therefore, delays when the center server 14 acquires environment information can be reduced.

Moreover, the present embodiment has the feature that the time information, which is stored in the transmission data list 270 of the storage 204, is the time difference that is the time period that has elapsed from the final communication time. In communication standards, such as LPWA, that enable communication that is lower power than mobile communication standards and longer range than short-range wireless communication standards, because the communication speed is slower than that of mobile communication standards, transmission takes time when the transmission data is a large amount of information. Therefore, in the present embodiment, at the time of storing the data that cannot be transmitted in the storage 204, the time difference, and not the year/month/date or the time, is appended to the environment information. Namely, in accordance with the present embodiment, by decreasing the amount of information relating to the time information, the transmission time when transmitting the transmission data to the center server 14 can be shortened.

Second Embodiment

In the first embodiment, the central GW 20A judges the feasibility of communication based on the speed of the vehicle 12, and the feasibility of communication based on the position information of the vehicle 12. In contrast, the second embodiment differs from the first embodiment with regard to the point that the judgement on the feasibility of communication that is based on the position information of the vehicle 12 is carried out at the car navigation system 40. The point that differs from the first embodiment is described hereinafter. Note that the structure of the vehicle communication system 10 of the present embodiment is similar to that of the first embodiment, and description thereof is omitted.

An example of the flow of processings up until the feasibility of communication is judged at the vehicle 12 in the present embodiment is explained with reference to the sequence drawing of FIG. 9.

Processings from step S40 through step S43 in FIG. 9 are the same as the processings from step S11 through step S14 of FIG. 4.

Note that the processings of acquiring the respective information and storing the transmission data from step S40 through step S42 are executed at a predetermined period.

In step S44, at the central GW 20A, the CPU 201 executes feasibility judging processing. In the feasibility judging processing of the present embodiment, the CPU 201 requests that the car navigation system 40 judge the feasibility of communication on the basis of the position information, and acquires the results of the judgement on the communication feasibility that is based on position information from the car navigation system 40. Then, the CPU 201 carries out a final judgment as to whether or not communication is possible, by taking the speed of the vehicle 12 into consideration.

In step S45, the car navigation system 40 executes feasibility judging processing that is based on the position information. Concretely, the car navigation system 40 executes feasibility judging processing that is based on the position information, while referring to the position information and the area information. Note that, in the present embodiment, the area information 272 is stored in the car navigation system 40.

As described above, in the feasibility judging processing of the present embodiment, the processings of step S101, step S103, step S104, step S106 and up through step S107 in the feasibility judging processing of the first embodiment (see FIG. 6) are executed at the car navigation system 40. Further, the processings of step S100 and step S102 are executed at the central GW 20A, and the final judgment on the feasibility of communication is carried out while taking into consideration the results of the feasibility judgement that are based on the position information and that are received from the car navigation system 40.

In the present embodiment as well, effects that are similar to those of the first embodiment can be obtained. In particular, in the present embodiment, there is no need for the central GW 20A to have the area information 272, and the map data that the car navigation system 40 has, and the LPWA area information or the Wi-Fi spot information, can be combined therewith.

[Notes]

In the above-described respective embodiments, whether or not communication is possible is judged on the basis of the speed of the vehicle 12 and the position information of the vehicle 12. However, the present disclosure is not limited to this. For example, in a case of using the long-range communication ECU 20B that is based on an LPWA standard that is excellent for communication during traveling, the feasibility of communication by the long-range communication ECU 20B may be judged on the basis of only the position information of the vehicle 12. Further, in a case of using the long-range communication ECU 20B that is based on an LPWA standard that is resistant to obstructions, the feasibility of communication by the long-range communication ECU 20B may be judged on the basis of only the speed of the vehicle 12.

Further, although the central GW 20A that is the onboard communication device, and the long-range communication ECU 20B and the short-range communication ECU 20C are separate ECUs 20 in the above-described embodiments, the present disclosure is not limited to this, and these may be combined into a single ECU 20. In this case, the ECU 20 that is the onboard communication device also has, in addition to the respective structures that the central GW 20A has (see FIG. 2), an interface for LPWA and an interface for Wi-Fi.

Further, at the central GW 20A of the respective embodiments, in a case in which the CPU 201 that serves as the judging section 254 judges the communication feasibility of the short-range communication ECU 20C, the judgment is carried out on the basis of the area information 272 that the storage 204 has. However, the present disclosure is not limited to this. The CPU 201 may judge that communication by the short-range communication ECU 20C is possible in a case in which the CPU 201 senses a Wi-Fi signal from the relay device 16 that is a Wi-Fi spot that can be connected to.

Further, in the respective embodiments, air pressure information and odor information that are environment information are used as examples of the vehicle information that is transmitted to the center server 14, but the present disclosure is not limited to this. The vehicle information that is transmitted to the center server 14 can include various types of information such as the capacity of the battery that is used in driving the vehicle 12, the distance traveled, the time traveled, the temperature of the motor, impact (acceleration), and the like.

Note that any of various types of processors other than a CPU may execute the respective processings that the CPU 201 executes by reading-out the communication program 260 in the above-described embodiments. Examples of processors in this case include PLDs (Programmable Logic Devices) whose circuit structure can be changed after production such as FPGAs (Field-Programmable Gate Arrays) and the like, or dedicated electrical circuits that are processors having circuit structures that are designed for the sole purpose of executing specific processings such as ASICs (Application Specific Integrated Circuits) and the like, or the like. Further, the respective processings may be executed by one of these various types of processors, or may be executed by combining two or more of the same type or different types of processors (e.g., plural FPGAs, or a combination of a CPU and an FPGA, or the like). Further, the hardware structures of these various types of processors are, more concretely, electrical circuits that combine circuit elements such as semiconductor elements and the like.

Further, the above-described respective embodiments describe forms in which the program is stored in advance (is installed) on a non-transitory recording medium that can be read by a computer. For example, at the central GW 20A of the vehicle 12, the communication program 260 is stored in advance in the ROM 202. However, the present disclosure is not limited to this. The communication program 260 may be provided in a form of being recorded on a non-transitory recording medium such as a CD-ROM (Compact Disc Read Only Memory), a DVD-ROM (Digital Versatile Disc Read Only Memory), a USB (Universal Serial Bus) memory, or the like. Further, the respective programs may be in a form of being downloaded from an external device via a network.

The flows of processings described in the above embodiments are examples, and unnecessary steps may be deleted, new steps may be added, or the order of processings may be rearranged, within a scope that does not depart from the gist of the present disclosure.

What is claimed is:

1. An onboard communication device that carries out communication with an exterior of a vehicle via a communication section that is installed at the vehicle and is configured to execute a communication standard that enables communication that is lower power than mobile communication standards and is longer range than short-range wireless communication standards, the onboard communication device comprising:
    an acquiring section that acquires a speed of the vehicle;
    a judging section that judges whether or not communication by the communication section is possible, based on an acquisition result of the acquiring section; and
    a control section that effects control such that, in a case in which it is judged that communication by the communication section is not possible, vehicle information is stored together with time information in a storage section, and, in a case in which it is judged that communication is possible, the communication section transmits, to an external device at the exterior of the vehicle, the vehicle information to which is appended the time information that is stored in the storage section.

2. The onboard communication device of claim 1, wherein the communication section carries out communication in one direction that is only transmission.

3. The onboard communication device of claim 1, wherein, in a case in which the judging section judges that communication by the communication section is not possible, the control section stores a time period that has elapsed from a final communication time, in the storage section as the time information.

4. The onboard communication device of claim 1, wherein:
    communication with the exterior of the vehicle is possible via, in addition to the communication section, another communication section that is installed at the vehicle and is configured to execute another communication standard that is different than the communication standard,
    the judging section judges whether communication by the another communication section is possible based on area information of the another communication standard or in a case in which a signal of the another communication standard is sensed, and
    in a case in which the judging section judges that communication by the communication section is not possible and that communication by the another communication section is possible, the control section effects control such that the another communication section transmits, to the external device, the vehicle information to which is appended the time information that is stored in the storage section.

5. The onboard communication device of claim 4, wherein the another communication standard is a short-range wireless communication standard.

6. The onboard communication device of claim 1, wherein a center server, which detects situations of usage of and trouble with vehicles and which manages the vehicles, is included in the external device.

7. The onboard communication device of claim 1, wherein environment information that relates to an in-cabin air environment of the vehicle is included in the vehicle information.

8. A communication method between a communication section, which is installed at a vehicle and is configured to execute a communication standard that enables communication that is lower power than mobile communication standards and is longer range than short-range wireless communication standards, and an external device at an exterior of the vehicle, the method comprising:
    an acquiring step of acquiring a speed of the vehicle;

a judging step of judging whether or not communication by the communication section is possible, based on an acquisition result of the acquiring step; and a control step of effecting control such that, in a case in which it is judged that communication by the communication section is not possible, vehicle information is stored together with time information in a storage section, and, in a case in which it is judged that communication is possible, the communication section transmits, to the external device, the vehicle information to which the time information is appended.

9. A non-transitory computer readable storage medium that stores a communication program executable by a computer to perform the respective steps of the communication method of claim 8.

\* \* \* \* \*